March 14, 1933.  C. W. P. HEYLANDT  1,901,446
METHOD OF CONSERVING LIQUEFIED GASES
Filed Nov. 21, 1927

INVENTOR
Christian Wilhelm Paul Heylandt
BY
Watson, Bristol, Johnson & Leavenworth
ATTORNEYS Patented Mar. 14, 1933

1,901,446

UNITED STATES PATENT OFFICE

CHRISTIAN WILHELM PAUL HEYLANDT, OF LANKWITZ, GERMANY, ASSIGNOR TO FLUGA AKTIEN-GESELLSCHAFT, OF ST. MORITZ, SWITZERLAND

METHOD OF CONSERVING LIQUEFIED GASES

Application filed November 21, 1927, Serial No. 234,914, and in Germany November 24, 1926.

This invention relates to a method of conserving liquefied gas held in containers of the insulated variety, and has for its object generally an improved procedure for collecting and storing the gas evolved in the container by normal evaporation during periods of non-consumption of gas material.

More specifically, it is an object to store the gas evolved from containers of the character indicated in a manner which does not involve high pressures and utilizes the adsorption effect produced by highly chilling a body of finely divided adsorbing material of a character which is non-combustible.

It is a further object to provide a body of adsorbent material such as silica gel in a vessel having communication with the gas space of the container and arranged to utilize the refrigerating effect of the liquefied gas withdrawn during periods of consumption to increase the adsorbent capacity of the body.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

Figure 1:
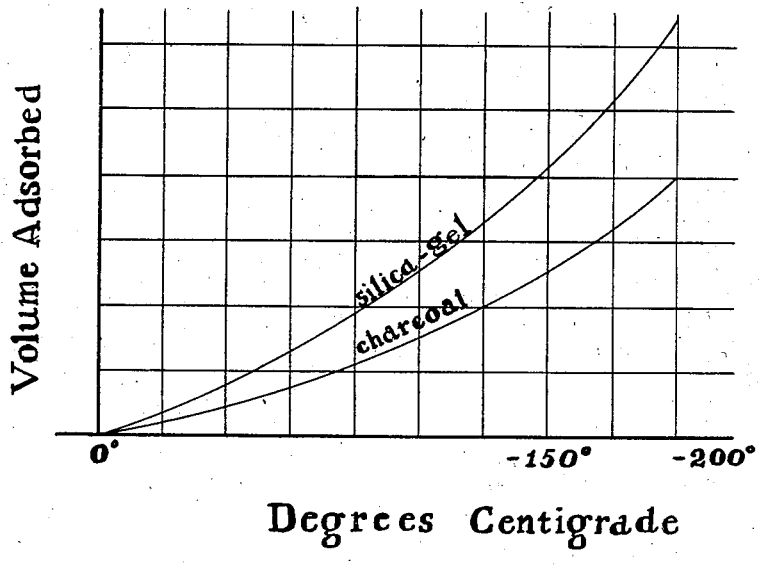
Figure 2:
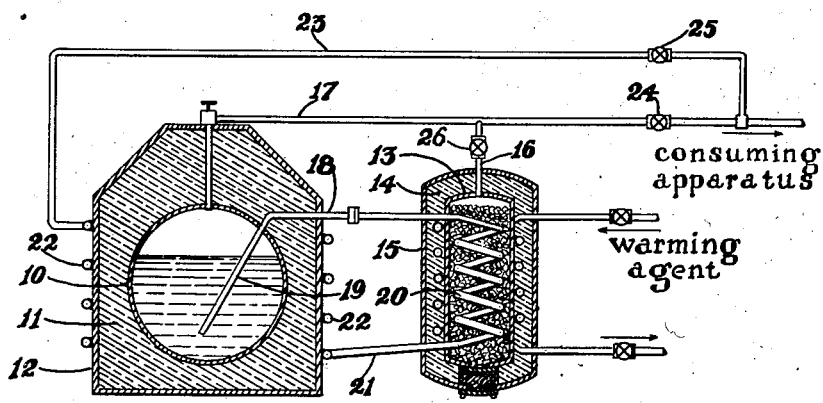

For a fuller understanding of the nature and objects of the invention reference should be had to the following detailed description taken in connection with the accompanying drawing, in which:

Fig. 1 is a chart exhibiting the comparative adsorbent capacities of bodies such as charcoal and silica gel at various low temperatures; and Fig. 2 is a view mainly in vertical cross-section showing an exemplary embodiment of apparatus arranged for the practice of the invention.

In order to conserve gas material in accordance with the present invention, a body of porous material having a relatively great adsorbent capacity is disposed in a vessel and placed in communication with a container for the liquefied gas. Such container is relatively highly insulated in order to reduce heat leakage from outside to the liquid within to a comparatively small value, and may be of any suitable form, for example that shown in my co-pending application Serial No. 224,268, filed October 5, 1927.

Charcoal is a well-known material having a high adsorbent capacity, but it oxidizes readily and therefore makes it possible for dangerous conditions to arise. The adsorbent capacity of charcoal and like carbonaceous materials is low, however, as compared with certain other materials such as silicic acid gels.

It has been ascertained by experiment that certain gels at temperatures near the boiling point of liquefied gases such as liquid air, oxygen and the like, have in general a much higher adsorbent capacity than corresponding amounts of charcoal, and will consequently occupy less space than the latter when arranged to provide equal amounts of adsorbent capacity. The advantage in the use of such gels, however, arises mainly from the fact that silicic acid gel is noncombustible and hence when brought in contact with a combustion supporting substance such as oxygen, whether directly or indirectly, is substantially inactive and avoids the dangers and possibility of explosion incident to the use of charcoal.

The silicic acid gel here preferred in the practice of the invention is that which has been separated out in gel shape from a water glass solution, for example that obtained when carbon dioxide is passed through such a solution. Such gel when chilled to relatively low temperatures, for example to a temperature of $-183°$ C. the boiling point of liquid oxygen, has an adsorbent power which is more than 50% over that of an equal amount of charcoal. Moreover, the adsorbent capacity grows considerably as the temperature is lowered below $0°$ C.

A body of silica gel when connected to the container for liquefied gases, as here proposed, assumes the action of a pump without having moving parts such as valves and pistons to draw over and store the gas evolved by natural evaporation from the container during periods of non-consumption. By referring to the curve for silica gel in Fig. 1 of the drawing, where the comparative adsorbent capacities of charcoal and silica gel are depicted, one can ascertain the desired amount of silica gel that is to be provided according to the invention in communication with a container for liquefied gas when the rate of evaporation during periods of non-consumption is known.

According to the method of the present invention, the body of silica gel used for providing adsorption is utilized at its highest practical capacity. This is accomplished by chilling the gel by means of the refrigerating effect of the liquefied gas withdrawn and supplied to consuming apparatus during periods of gas consumption. An arrangement of apparatus suitable for accomplishing this is shown in Fig. 2, where 10 denotes a vessel for holding liquefied gas having a mantle of insulating material 11 enclosed in an envelope or casing 12. A vessel 13 having a mantle of insulation 14 and a casing 15 is provided having communication by way of the conduits 16 and 17 with the gas space above the surface of the liquefied gas in the vessel 10. A liquid phase withdrawal conduit is shown at 18 having its inner end 19 depending below the liquid level in the vessel 10. This conduit leads through the wall of the container and is arranged to communicate with a chilling coil 20 disposed in the vessel 13 and arranged to be in thermal contact with the adsorbent material contained therein. The coil 20 has an outlet connection 21 leading to a heating coil 22 which may be supported on the exterior of the container for liquefied gas in the manner shown. From the far end of the heating coil 22 a connection 23 leads to a point in the gas supply conduit 17 beyond that at which the vessel 13 communicates by way of conduit 16. Suitable flow-controlling means are provided in these conduits, for example valves, as shown at 24, 25 and 26.

The gas stored in the vessel 13 by adsorption under low temperatures and at slight pressures may later be released for consumption by warming the adsorbent material in the vessel 13. Accordingly, a coil is shown surrounding the vessel 13, through which a suitable agent may be circulated for warming the gel beyond the zero point to supply gas at a pressure equal to or slightly above that in the conduit 17.

In operation during periods of consumption, the gas supply conduit 17 is opened by means of the valve 24 to permit the passage of gas material in the gas phase from the container 10 to the consuming apparatus. When the gas pressure has been sufficiently reduced by withdrawal through the conduit 17, the further supply of gas material is obtained by withdrawal of gas material in the liquid phase through the conduit 18. This liquid first traverses the space in the vessel 13 chilling the adsorbent material therein and thereby becomes heated and vaporized, the final heating being accomplished by means of the heating coil 22, the vaporized gas material passing to the consuming apparatus by way of the connection 23 when the valve 25 is opened.

The adsorbent material in the vessel 13, when cooled by the passage of the cold liquid being withdrawn from the container 10 by way of conduit 18, has its adsorbent capacity greatly increased during periods of consumption. The gas which vaporizes in the container 10 during a period of non-consumption, is, in consequence, drawn over into the vessel 13, where it is adsorbed by the material therein, the valves 24 and 25 being closed during this period, the valve 26 in the conduit 16 being open except when it is desired to cut the vessel 13 out of operation. This adsorption permits the gas evolved during periods of non-consumption to be stored and conserved without unduly raising the pressure in the container 10. It is sometimes advantageous to keep the valve 26 closed during the period when liquid is being withdrawn, so that the adsorbent will have a capacity to adsorb a larger volume of gas when consumption of gas material ceases. When it is desired again to supply gas to consuming apparatus, the gas stored in the vessel 13 is withdrawn and utilized by heating the vessel 13, as indicated above, until substantially all the stored gas is evolved and passed into the conduit 17 and supplied to the consumping apparatus. After this, the gel or material in the vessel 13 is cooled by the passage of liquid through the conduit 18 until the period of consumption terminates, when another period of non-consumption accompanied with adsorption and storage of gas from the container 10 will ensue.

Having described my invention, what I claim as new and desire to secure by Letters Patent, is:

1. The method of conserving liquefied gas held in a container which comprises cooling an adsorbent by passing the liquefied gas in thermal contact with the adsorbent during periods of consumption of the liquefied gas, and adsorbing the gas evaporated from the liquefied gas in the adsorbent during periods of non-consumption.

2. The method of conserving liquefied gas held in a container which comprises passing the liquefied gas in thermal contact with a body of silica gel adsorbent during periods of consumption of the liquefied gas, and adsorbing the gas evaporated from the liquefied gas in the said silica gel adsorbent during periods of non-consumption.

3. The method of conserving liquefied gas held in an insulated container which comprises cooling a body of silica gel adsorbent with the liquefied gas during periods of consumption of the liquefied gas, adsorbing the gas evaporated from the liquefied gas in the said silica gel adsorbent during periods of non-consumption, and thereafter heating said adsorbent to evolve the gas therefrom.

In testimony whereof I have signed my name to this specification.

CHRISTIAN WILHELM PAUL HEYLANDT.